United States Patent [19]

Riedl

[11] 4,263,380

[45] Apr. 21, 1981

[54] GALVANIC ELEMENT

[75] Inventor: Werner Riedl, Ellwangen, Fed. Rep. of Germany

[73] Assignee: Varta Batterie Aktiengesellschaft, Hanover, Fed. Rep. of Germany

[21] Appl. No.: 71,760

[22] Filed: Aug. 31, 1979

[30] Foreign Application Priority Data

Sep. 30, 1978 [DE] Fed. Rep. of Germany ....... 2842697

[51] Int. Cl.³ .............................................. H01M 6/00
[52] U.S. Cl. .................................... 429/162; 429/174; 429/177; 429/185
[58] Field of Search ............... 429/185, 184, 181, 174, 429/171-173, 162-164, 177

[56] References Cited

U.S. PATENT DOCUMENTS

| | | | |
|---|---|---|---|
| 3,096,217 | 7/1963 | Clune | 429/173 X |
| 3,489,616 | 1/1970 | Eaugradt et al. | 429/162 X |
| 3,615,861 | 10/1971 | Braem | 429/162 |
| 3,746,580 | 7/1973 | Aker et al. | 429/162 X |
| 3,970,477 | 7/1976 | Ciliberti | 429/173 |
| 3,990,918 | 11/1976 | Bro et al. | 429/185 |
| 4,118,544 | 10/1978 | Przybyla et al. | 429/162 X |
| 4,166,157 | 8/1979 | McCormick | 429/174 |

*Primary Examiner*—Anthony Skapars
*Attorney, Agent, or Firm*—Weiser, Stapler & Spivak

[57] ABSTRACT

A galvanic element of buttom cell configuration is provided, in addition to the usual seal of thermoplastic material between cell terminal and cell cup, with an additional seal. This fills the annular gap which is created when a contact cap surrounding the galvanic element is attached to the cell terminal.

The second seal is made, for example, by casting of bitumen or casting resin into the annular gap, shaking in of synthetic plastic powder and subsequent heat treatment for attachment, or by displacement of a heat sensitive glue from the contact cap in response to pressing into the cell. Also, pre-fabricated ceramic rings with metalized surfaces, which are soldered in place between cell cup and contact cap, may be used as the second seal.

8 Claims, 5 Drawing Figures

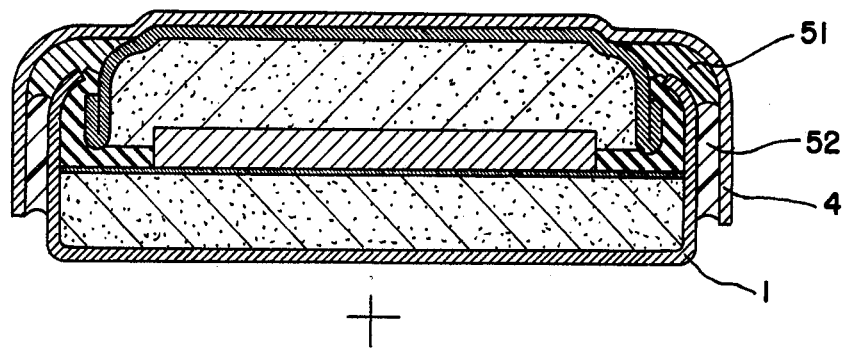
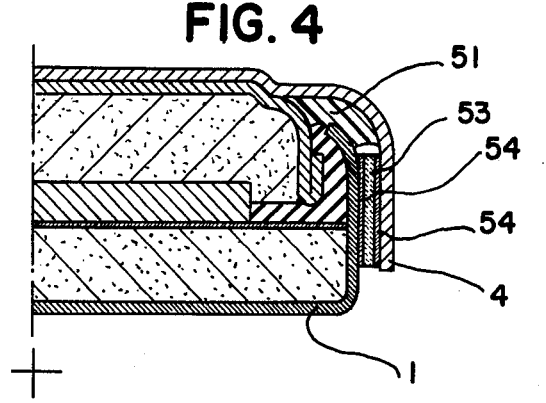
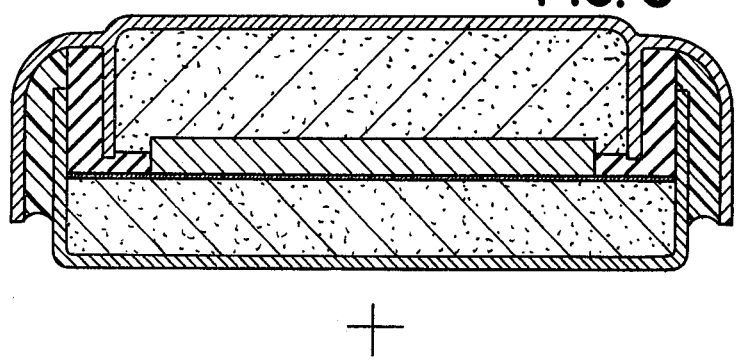

GALVANIC ELEMENT

The invention relates to a galvanic element having a positive electrode, a negative electrode, a separator, an electrolyte and a housing which is closed in liquid-tight manner by a seal, the seal simultaneously providing the electrical insulation between the cell terminals.

There are known a variety of arrangements for the sealing of galvanic elements, as well as methods for making such seals. In particular, there are used for the creation of seals for galvanic elements, ring-shaped seals with various cross-sectional shapes of dielectric synthetic plastics which seal the housing portions which are generally made of metal and which insulate them electrically from each other.

By way of example in German Patent Publication (Auslegeschrift) No. 2,017,082 there is described a sealing arrangement in which the edge of the cell lid of a button cell is made with accordion shape and penetrates into an annular seal. Other known forms of construction of seals may have L-shaped cross-section.

To reinforce the sealing effect in the boundary region of plastic and metal, it is also known, for example, (German Pat. No. 1,273,641) to subject the cell with the seal mounted thereon to a radial pressure, and this pressure can go as high as the elastic limit of the metallic material of the cell housing.

It is also known to provide the seal itself with an additional plastic or adhesive coating in order to fill in capillaries on the surfaces in the metal/plastic boundary region and thereby prevent creeping of the electrolyte as much as possible (German Pat. No. 1,099,018).

Similarly, in U.S. Pat. No. 3,713,896, it is proposed to coat a surface of the sealing region of the metal housing or cell cover with an epoxy polyamide resin in electrolyte-tight manner and then additionally provide the electrical insulation by means of a sealing element of a thermoplastic material. Furthermore, from German Pat. No. 2,201,811, it appears that it may be desirable to glue the elastic sealing ring initially to a portion of the housing, e.g. the cover and to test the seal before assembly. For the solution of the sealing problem it is also known to mount a sealed galvanic button cell with its metal housing in an additional, larger sealed housing of an appropriately larger button cell (U.S. Pat. No. 3,891,462).

Also widely used is the sealing of cells by means of a so-called "double lid" (German Pat. No. 1,028,642). Here the lid consists of two domed discs, whose central portions are mated with each other, while their rim portions are separated from each other and thereby create an annular gap around the periphery of the lid into which there extends a portion of the elastic seal.

In addition, there are shown, for example, in German Patent Publication (Offenlegungsschrift) Nos. 2,773,948 or 2,800,162 sealing arrangements in which the cell terminal is led through a metal lid by means of a glass or ceramic seal.

All of these known arrangements provide a partial advance toward the solution of the problem, namely to prevent or at least retard the creepage of the hydroxide in and through the seal area. However, it has been found that the reliability of such arrangements made by mass production is not sufficient, particularly to provide a hydroxide-tight hermetic sealing during multi-year operation of the galvanic element under the most varied climatic conditions.

The majority of the known arrangements has the disadvantage that the sealing elements are surrounded by a portion of the housing which is in direct mechanical contact with the electrochemical system. Yet when the housing is still unclosed, wetting of the sealing region by the electrolyte during assembly cannot be reliably prevented. Due to transport movements by means of the automatic assembly machinery as well as due to pressure or shock applied to the housing portions and seals in the various assembly or closure operations, hydroxide can be entrained uncontrollably into the plastic seal/housing metal boundary region. However, the hydroxide creeps preferentially along metal surfaces which have already once been wetted with hydroxide, even when these locations can be protected if timely limited by seals. A long-term effect, particularly in case of multi-year weak discharge of the element, leads sooner or later to electrolyte escape. Galvanic elements which are particularly critical in this respect are those in button cell form with very small dimensions, e.g. with an overall height of less than 3 mm in which only creepage paths of less than 1 mm length exist at the sealing element/metal housing boundary surfaces.

The undesired effect of electrolyte escape manifests itself, for plastic seals and relative humidity of more than 80%, already within a few weeks. This electrolyte escape can destroy through corrosion the electrically conductive portion of an instrument which is in contact with a galvanic element, particularly in tightly closed, small housings in which high humidity is present, e.g. for wrist watches, pocket calculators, etc., and thereby put these instruments out of action.

The procedure proposed in U.S. Pat. No. 3,891,462, and which in itself is advantageous, of placing a completely assembled button cell inside a second button cell housing carries with it a great sacrifice of space and is therefore not suitable particularly for very small galvanic elements. Likewise, ceramic lead-throughs or glass lead-throughs require, within galvanic elements of very small dimensions, too large a seal volume, and they thereby create a considerable loss of capacity for a given volume.

Accordingly, it is an object of the present invention to provide a galvanic element, particularly with an alkaline electrolyte, which is capable of being manufactured with known mass production technology and which possesses a trouble-free seal. This seal is to be useable for all galvanic elements, but particularly for button cells with very small dimensions, for example with a diameter of less than 11.6 mm and a height of less than 3 mm, in which the volume of the seal is to be as small as possible.

This and other objects which will appear are achieved in accordance with the invention by providing a contact cap which covers one cell terminal, the seal region, and a portion of the second cell terminal, and an additional seal between at least this covered portion of the second cell terminal and the contact cap.

Thus in a button cell, for example, a cup-shaped contact cap covers the cell lid and the seal as well as the major portion of the cell cup. Between cell cup and contact cap an additional seal is inserted. This additional sealing material extends essentially over the entire height of the cell cup and fills the annular gap between contact cap and completed button cell.

To achieve completely secure sealing, the galvanic element is preferably washed after its manufacture, and, if desired, cleaned by means of ultrasonics, so that hydroxide traces which may possibly cling to the capillaries of the sealing region are reliably removed. After performing, if desired, a surface inspection for hydroxide traces, the second highly effective seal, free of electrolyte traces, can be applied.

According to the invention, the manufacture of the galvanic element thus takes place in several stages. First a cell is fully assembled in conventional manner; it includes for example a conventional thermoplastic seal conforming to the state of the art, or one of the known ceramic lead-throughs. Thereafter this cell is subjected to a cleaning process, particularly when great importance is placed upon reliable sealing over unusually long periods of time, in which the remnants of hydroxide are removed from the outer cell edge and the seal. For example, the cell is washed or subjected to ultrasonic cleaning, in several stages if desired.

There is then applied to this element a contact cap which at least partially extends beyond the galvanic element and this is connected with a cell terminal by spot welding, soldering, or by gluing with a conductive glue after having been emplaced. Thereafter, the annular gap between contact cap and galvanic element is filled with a suitable material which provides a sealing effect. Particularly suitable for this are casting resins, which may either be dosed into the gap with needle valves, or else the cell may be dipped into a casting resin so that the gap is filled with the casting resin. Of course, a plurality of galvanic elements can be subjected simultaneously to this immersion operation. If desired, the influence of a vacuum can also be utilized particularly for viscous casting materials. Particularly when the filling of the gap between contact cap and galvanic element is performed by means of a dipping operation it may be appropriate and even necessary to carry out an after-treatment in order to remove the excess casting resin present on the outside of the element.

In addition, it is possible to fill the annular gap between contact cap and galvanic element with a synthetic plastic powder and to harden this powder through the application of heat. To this end the element, after emplacing of the contact cap, may be passed through a powder bath, for example, and the introduction of the powder into the annular gap may be promoted through vibration if desired.

Finally, it is also possible to slide a preformed ring seal into the annular gap and then glue it to the metal surfaces of the cell cover, or cell cover and contact cap, through the application of heat. This preformed part may also be a seal consisting of a ceramic material which is then provided with solder on both sides and which is then soldered to the metal surfaces of the cell cup or cell cover and contact cap by the application of heat.

Finally, it is also possible to fill the contact cap with the desired volume of casting resin or glue prior to emplacing and then to press the cell into it in its proper position. In so doing, there can be used in particular highly viscous sealing materials. Such a sealing material is then displaced during pressing in of the cell and moves upwardly inside the annular gap. Surprisingly, it has been found that in such a process a sufficient and good electrical contact is created between cell and contact cap without there being required an additional spot welding operation. If necessary, however, such an operation can be carried out without particular difficulty, or else a conductive glue can be positioned in the contact region.

Of course it is also possible to provide the contact cap with a performed seal or to coat it on its ring-shaped interior with a sealing material and then press the cell into the contact cap. Of course, if desired, the outer edge of the cell or of the cell cap can also be coated with such a preformed sealing material or it can be provided with a seal and then the contact cap pressed onto it. Such a contact cap which already contains the seal may, for example, be also firmly attached to an electronic instrument so that the cell will be subsequently pressed into the contact cap and an additional seal created in that manner.

The annular gap between the cell and the contact cap should have a width of about 0.2 mm to about 1 mm. The gap width depends mainly upon the viscosity and the material properties of the casting material or of the prefabricated sealing material. The annular gap should of course be so dimensioned that the least possible volume and therefore the least possible capacity is sacrificed. For a button cell with a diameter of 7.9 mm and a height of 2.1 mm the gap may, for example, have a width of 0.2 mm. The positioning precision which this requires can be achieved without particular difficulty in automated manufacturing. The contact cap itself preferably extends in height to a little above the bottom surface of the galvanic element, particularly for button cells. In a small button cell of the foregoing example, the contact cup should end about 0.5 mm above the bottom of the element. Of course for cells which have a great structural height, the contact cup should not extend over anywhere near the entire element height.

Use of one of the previous described possible procedures depends primarily upon the selection of the material of which the outer, or additional sealing ring consists. This additional sealing material may, for example, be bitumen, which is utilized as a suspension in a solvent. Also useable are one or multi-component casting resins, for example modified epoxy resin, branched hydrocarbon casting resins (isocyanate resins), silicone resins, one-and-two-component RTV polymers, branched polyurethane, polyvinyl ether. In addition, there may be used glue suspensions made for example on the basis of cyanacrylate, acrylic acid ester, polyamide and the like. Finally, a variety of highly viscous adhesives may be used. Also thermoplastic resins such as ethylene vinyl acetate copolymer, or silicone rubber are suitable as sealing materials. Also, combinations of two different sealing means made from these materials are possible. For example, an adhesive casting may be combined with a more rubbery elastic casting material. Moreover, prefabricated ceramic rings may be used, for example, as sealing material which have been provided with a surface metallization in the form of a solder which is then tightly connected to the metal surfaces by the application of heat. In addition, there may be used particularly synthetic plastic powder, for example epoxy resin powder which is introduced into the sealing gap and melted through the application of heat.

As heat source, there may be used, for example, inductive heating.

Also prefabricated synthetic plastic rings which are coated, for example, with a heat-sensitive glue or which consist of heat sensitive glue, may be used, which are also glued after introduction to the sealing regions through heat treatment.

For further details, reference is made to the description which follows in light of the accompanying drawings wherein FIG. 1 shows the general arrangement of an additional seal embodying the invention;

FIGS. 3 and 4 show variants of the additional seal in such a button cell; and

FIG. 5 shows another possible structural arrangement according to the invention.

Figure 1:
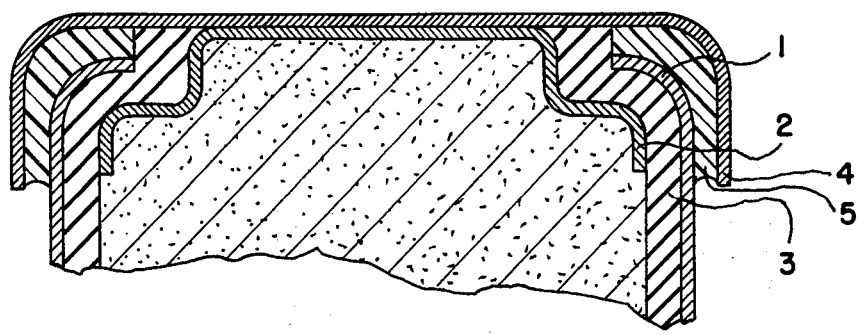

According to FIG. 1, a first cell terminal 2 is led out through housing 1, in which are located the not-further-shown active components of the galvanic element. This terminal is sealed to the housing by a sealing material 3 and is electrically insulated thereby. In accordance with the invention, a cap 4 is drawn over the cell housing and this contact cap is provided with an additional seal 5 with respect to the cell housing 1, i.e. with respect to the second terminal of the galvanic element. This additional seal, which may be applied, for example, after complete cleaning of the cell, insures trouble-free sealing over a long period of time and also reliably prevents electrolyte escape.

Figure 2:
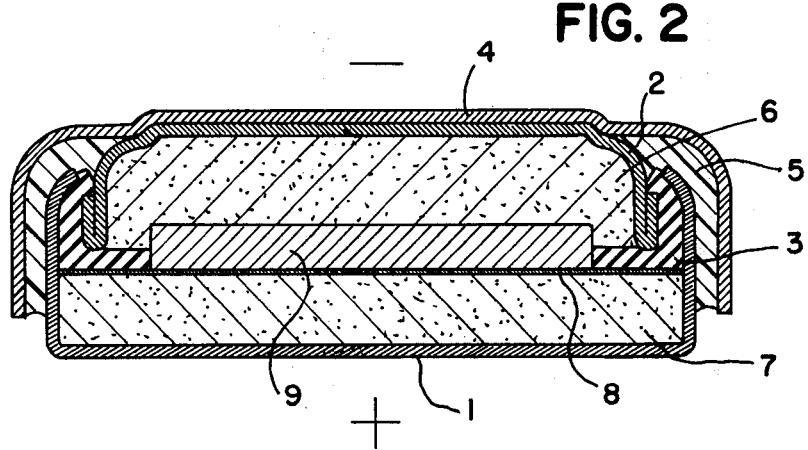
FIG. 2 shows a cross-section through a button cell with a seal according to the invention.

FIG. 2 shows the application of the invention to a conventional button cell. This button cell has a negative electrode 6, a positive electrode 7, a separator 8, and a swelling sheet 9, as well as an alkaline electrolyte. Between cell cup 1 and cell cover 2 there is provided the conventional seal 3, e.g. of a thermoplastic material. Over the cell there is inverted a contact cap 4 which defines together with the outer edge of the cell cup an annular gap which is filled with a sealing material in accordance with the invention. As sealing material there are used the previously mentioned casting resins or similar materials.

According to FIG. 3, a first sealing material 51 and a second sealing material 52 are introduced into the annular gap. The sealing material 51 preferably has a viscously adhesive consistency in order to achieve strong adhesion to the seams of the inner seal 3. On the other hand, the second sealing material 52 has more elastic properties in order to provide an elastic termination toward the outside. For example, combinations of polyamides and polyurethanes are suitable as the viscously adhesive material 51 and the elastic material 52, respectively.

Finally, according to FIG. 4, there is provided first a seal 51, preferably again a casting of a viscously adhesive material. In addition, there is positioned between contact cap and cell cup a prefabricated sealing ring, for example of a ceramic material 53 which is coated on both sides with metal solder 54. Through heat application, the metal solder is then fused together with the adjoining metal walls.

FIG. 5 shows an embodiment of a button cell in which the cell cover and the contact cap form a unit. For example, it is possible to produce such a cell cover by a cold extrusion process, during which the portion which later forms the contact cap has not yet been crimped. The cell cup is then assembled, with interposition of the conventional seal, and then the portion of the cover blank which is to form the contact cap is subjected to bending down or crimping with interposition of an additional seal.

The effectiveness of the sealing of a galvanic element with alkaline electrolyte in a standard atmosphere of 20° C. and relative humidity of 50% can ordinarily be visually determined only after a time span of one to three years. Under these conditions, there forms on elements which have not been perfectly sealed a ring-shaped white coating of carbonate crystals which are formed under the influence of $CO_2$ by the escaping hydroxide. To achieve the possibility of a more rapid evaluation of the seal, there is frequently performed a storage at 45° C. and at increased relative humidity of about 90%. This is based on the fact that storage for eighty days at a temperature of 45° C. and a relative humidity of 90% corresponds approximately to the effects of a realistic storage of two years at the standard temperature of 20° C. and relative humidity of 50%.

In general it can be said that, to achieve high sealing quality, it is more desirable to use sodium hydroxide rather than potassium hydroxide, that a greater structural cell height is better sealable than a cell of small structural height, and that a greater cell diameter also yields better results with respect to sealing than a smaller diameter. In particular, the length of the creepage path has a considerable influence upon the seal, in addition to the qualitative realization of that seal.

The seal proposed in accordance with the invention, utilizing two independently produced sealing systems, provides an absolutely hydroxide-free closure, as is shown by the following comparative results, which were obtained for storage at 45° C. and relative humidity of 90%.

| Number of cells n = 100 | Visual Examination % Rejects Having Carbonate Traces Sodium Hydroxide "Elyt" Electrolyte | | | | | | | |
|---|---|---|---|---|---|---|---|---|
| | Prior art seal | | | | Seal according to the invention | | | |
| Days: | 10 | 20 | 40 | 60 | 10 | 20 | 40 | 60 |
| Diameter × Height in mm | | | | | | | | |
| 7.9 × 2.1 | 30 | 80 | >90 | — | 0 | 0 | 0 | 0 |
| 7.9 × 3.6 | 3 | 10 | 20 | 60 | 0 | 0 | 0 | 0 |
| 7.9 × 5.4 | 0 | 3 | 5 | 16 | 0 | 0 | 0 | 0 |

The experimental results were obtained with conventional button cells with alkaline electrolytes of the Ag$_2$O/Zn system (electrolyte NaOH about 26%). Between contact cap and cell cap there was provided in each case an annular gap of about 0.2 mm, which was filled with bitumen in suspension in perchlorethylene. It is noted that remarkable results can be obtained with the additional seal embodying the invention. When potassium lye is used as the electrolyte, such a significant improvement of the seal by means of the steps embodying the invention is also obtainable.

The seal according to the invention can, however, be used for the most varied types of galvanic elements. It is preferably useable for galvanic elements of flat construction, which are known as button cells, and it can of course be used both for primary elements and secondary elements. Preferably, however, it is used for primary elements of button cell construction which are intended for electronic instruments which are very sensitive to electrolyte escape, on the one hand, and which are to be operated over several years with such a primary element, on the other hand.

I claim:

1. Galvanic element including a positive electrode, a negative electrode, a separator, an electrolyte, and a housing which is closed in liquid-tight manner by a first seal which simultaneously provides electrical insulation between the cell terminals, said element comprising a contact cap which covers one terminal of the cell, the sealing region, and at least a portion of the second terminal of the cell, and an additional seal which is positioned at least between said covered portion of the second cell terminal and the contact cap.

2. The galvanic element of claim 1 wherein the element is in the form of a button cell, the contact cap extends over the cell cover, the first seal, and the major portion of the cell cup, and the additional seal is positioned between cell cup and contact cap.

3. The element of claim 2 wherein the additional seal extends substantially over the entire height of the cell cup.

4. The galvanic element of claim 1 wherein the second seal is made of a material selected from the group of bitumen, single- or multi-component casting resin, glue, thermoplastic resin, silicone rubber, or a combination of a plurality of said materials.

5. The galvanic element of claim 1 wherein the second seal is a ceramic ring with surface metallization.

6. The galvanic element of claim 1 wherein the additional seal is formed in an operation separate from the operation which forms the first seal and the additional seal is adjacent to, but not unitary with the first seal.

7. The galvanic element of claim 1 wherein the contact cap extends downwardly over the major portion of the cell cup and the second seal fills the space between contact cap and cell cup substantially as far as the lower end of the cell cup.

8. The galvanic element of claim 1 wherein the additional seal is formed of two discrete portions positioned adjacent to each other in the gap between cell cup and contact cap.

* * * * *